US012735512B2

(12) United States Patent
Chen et al.

(10) Patent No.: US 12,735,512 B2
(45) Date of Patent: Sep. 15, 2026

(54) PREPARATION METHOD OF MILK OLIGOSACCHARIDES AND OLIGOSACCHARIDE POWDER AND FOOD PREPARED THEREBY

(71) Applicant: Beijing Sanyuan Foods Co., Ltd., Beijing (CN)

(72) Inventors: Lijun Chen, Beijing (CN); Baoyu Yang, Beijing (CN); Minghui Zhang, Beijing (CN); Weicang Qiao, Beijing (CN); Junying Zhao, Beijing (CN); Jingyao Chen, Beijing (CN); Yanpin Liu, Beijing (CN); Jufeng Hu, Beijing (CN)

(73) Assignee: BEIJING SANYUAN FOODS CO., LTD., Beijing (CN)

( * ) Notice: Subject to any disclaimer, the term of this patent is extended or adjusted under 35 U.S.C. 154(b) by 663 days.

(21) Appl. No.: 18/176,611

(22) Filed: Mar. 1, 2023

(65) Prior Publication Data

US 2023/0203206 A1 Jun. 29, 2023

Related U.S. Application Data

(63) Continuation of application No. PCT/CN2022/135023, filed on Nov. 29, 2022.

(30) Foreign Application Priority Data

Dec. 29, 2021 (CN) ......................... 202111649065.5

(51) Int. Cl.

| | |
|---|---|
| ***C08B 37/00*** | (2006.01) |
| ***A23B 2/92*** | (2025.01) |
| ***A23L 33/125*** | (2016.01) |
| ***B01D 15/20*** | (2006.01) |
| ***B01D 61/02*** | (2006.01) |
| ***B01D 61/14*** | (2006.01) |
| ***B01D 61/42*** | (2006.01) |
| ***B01D 61/58*** | (2006.01) |
| ***B01D 69/02*** | (2006.01) |
| ***B01D 69/04*** | (2006.01) |
| ***B01D 71/02*** | (2006.01) |

(52) U.S. Cl.

CPC .............. *C08B 37/006* (2013.01); *A23B 2/92* (2025.01); *A23L 33/125* (2016.08); *B01D 15/206* (2013.01); *B01D 61/025* (2013.01); *B01D 61/0271* (2022.08); *B01D 61/029* (2022.08); *B01D 61/146* (2022.08); *B01D 61/1471* (2022.08); *B01D 61/149* (2022.08); *B01D 61/422* (2013.01); *B01D 61/58* (2013.01); *B01D 69/02* (2013.01); *B01D 69/04* (2013.01); *B01D 71/02* (2013.01); *B01D 2311/06* (2013.01); *B01D 2311/08* (2013.01); *B01D 2325/02833* (2022.08); *B01D 2325/02834* (2022.08); *B01D 2325/20* (2013.01)

(58) Field of Classification Search

CPC ................................ C07H 1/08; A23L 9/1465

See application file for complete search history.

(56) References Cited

U.S. PATENT DOCUMENTS

| | | | | |
|---|---|---|---|---|
| 6,288,222 B1 * | 9/2001 | Roth | ........................ | A23C 7/00 536/127 |
| 2012/0121788 A1 * | 5/2012 | Scott | ........................ | A23J 1/205 536/17.2 |
| 2019/0335779 A1 * | 11/2019 | Zambrini | ............. | A23C 9/1422 |
| 2020/0384041 A1 * | 12/2020 | Jennewein | ............ | A23L 33/125 |

FOREIGN PATENT DOCUMENTS

| | | |
|---|---|---|
| CN | 109270176 A | 1/2019 |
| CN | 109744316 A | 5/2019 |
| CN | 114539433 A | 5/2022 |

OTHER PUBLICATIONS

Briao, Resources, Conservation & Recycling 140 (2019) 313-323. (Year: 2019).*

International Search Report issued in International Application No. PCT/CN2022/135023; mailed Feb. 24, 2023.

* cited by examiner

*Primary Examiner* — Layla D Berry

(74) *Attorney, Agent, or Firm* — HAUPTMAN HAM, LLP

(57) ABSTRACT

The present application relates to the technical field of further processing of dairy products, and in particular to a preparation method of milk oligosaccharides, and milk oligosaccharide powder and food prepared thereby. The preparation method comprises the steps of: performing ultrafiltration of whey liquid for at least three times, subjecting the ultrafiltration permeate to nanofiltration concentration for several times, then subjecting the nanofiltration retentate to chromatographic separation and purification, collecting chromatographic collection liquid containing sialyllactose while removing the fraction containing lactose, subjecting the collection to desalination and drying to obtain oligosaccharide powder. The milk oligosaccharides prepared by the present method and the food product containing the same comprise basically bovine milk oligosaccharides, which are light yellow or white in color, light in flavor, uniform in size, and have good thermal stability and solubility. The milk oligosaccharides mainly comprise 3'-sialyllactose and 6'-sialyllactose.

6 Claims, 11 Drawing Sheets

PREPARATION METHOD OF MILK OLIGOSACCHARIDES AND OLIGOSACCHARIDE POWDER AND FOOD PREPARED THEREBY

CROSS-REFERENCE TO RELATED APPLICATIONS

The present application is a Continuation of International Application Number PCT/CN2022/135023 filed Nov. 29, 2022, and claims priority to Chinese patent application No. 202111649065.5 filed with the CNIPA on Dec. 29, 2021, and entitled "Preparation method of milk oligosaccharides and oligosaccharide powder and food prepared thereby", the disclosures of which are hereby incorporated by reference herein in their entireties.

TECHNICAL FIELD

The present application relates to the technical field of further processing of dairy products, and in particular to a preparation method of milk oligosaccharides, and oligosaccharide powder and food prepared thereby.

BACKGROUND ART

Breast milk is the only source of nutrition for newborns in the first stage of life. For centuries, breast milk has continuously evolved to nourish newborns and is regarded as the "gold standard" of nutrition for term babies. Human milk oligosaccharides (HMOs) are abundant and unique in breast milk, but have been neglected in nutrition for many years. At present, more than 200 components have been detected, of which more than 100 structures have been clarified.

Human milk oligosaccharides are of great structural diversity. There are great variations in both concentration and composition between individuals and during lactation period. They appear as free structures or combine with macromolecules such as glycoproteins and glycolipids. The structure of HMO mainly consists of five monomers: glucose, galactose, N-acetylglucosamine, fucose and N-acetyl neuraminic acid, each HMO comprising a lactose residue as its core, which can be elongated by repeated lactosamine units to form a straight or branched chain structure. The formed linear or branched chain structure can be further elongated in the presence of fucosyl transferase and sialic acid transferase to form a fucosylated and sialylated oligosaccharide.

HMOs, initially discovered as a "bifidus factor", can be used as a metabolic substrate for desired bacteria and contribute to the formation of dominant intestinal flora. Nowadays, more and more evidences have shown that HMOs also play a role in anti-adhesion, anti-bacteria, regulation of intestinal epithelium and immune cells, reduction of excessive mucosal leukocyte infiltration and activation, reduction of neonatal necrotizing enterocolitis, and provision of sialic acid as a potential necessary nutrient for brain development and cognition of infants. Therefore, the World Health Organization recommends that infants are exclusively breastfed for the first 6 months after birth. However, according to the Report on National Survey into Factors Influencing Breastfeeding released by China Development Research Foundation in February 2019, the rate of exclusive breastfeeding for the first 6 months of life was only 29.2%, which still fell short of the goal of 50% by 2020 set forth in the Outline for the Development of Chinese Children (2011-2020) and the National Nutrition Plan (2017-2030), and was far below the world average level of 43% as well as the average level of 37% for low- and middle-income countries. The low rate of breastfeeding in China is mainly caused by insufficient public awareness of breastfeeding, short maternity leave, lack of maternal and child rooms, lack of breast milk, occupation or illness of their own, etc. The infant formula provides sufficient nutrients for babies who are insufficiently breastfed or cannot be breastfeed. Since human milk oligosaccharides cannot be produced on a large scale, galactooligosaccharides and fructooligosaccharides are usually added to infant formula, which however does not contain fucose, sialic acid, and N-acetylglucosamine monomers present in human milk oligosaccharides, as demonstrated by studies.

It is a great progress to add 1 to 6 human milk oligosaccharide monomers to infant formula, and in vitro, in vivo, and clinical trials have proved that the human milk oligosaccharides have safety and immune effect. At present, high-pure human milk oligosaccharide monomer molecules (2'-fucosyllactose, difucosyllactose, lactose-N-tetrasaccharide, lactose-N-neotetrasaccharide, 3'-sialolactose, and 6'-sialolactose) have been approved by the European Union and the US Food and Drug Administration and can be used as supplements for infant formula. However, only addition of one or several human milk oligosaccharide monomers cannot simulate the complex structure of human milk oligosaccharides.

In recent years, membrane separation technology has developed rapidly and has been widely used in various industries due to the advantages of energy saving, consumption reduction, no phase change, and no pollution, and has been widely used in dairy industry, such as microfiltration sterilization, skim milk separation, whey separation, lactose concentration, reverse osmosis to remove water, etc., which shows incomparable advantages over traditional methods, and can realize the real recycling of by-products. Among them, the application of membrane technology to sterilization of milk and separation of milk components such as whey protein, casein, α-lactalbumin, β-lactoglobulin, α-casein, and β-casein has become a hot topic at home and abroad. Membrane separation technology is an environmentally friendly physical separation process, consumes less energy, compared with rotary, single-effect or multi-effect evaporation, freeze-drying, or spray drying, and does not need to add any toxic and harmful organic reagents in the separation process. Moreover, the operation temperature is low, which is especially suitable for heat-sensitive components, and will not destroy the natural structures of proteins, lactoses, and oligosaccharides, thus producing products with better functional characteristics. It shows more application value and a great practical prospect in dairy processing.

Bovine whey is a by-product produced in cheese manufacturing or a natural permeate prepared by microfiltration, which is usually discharged as waste liquid or prepared by spray drying into whey powder for sale at low prices. Compared with other livestock milk, it has the advantages of large quantity and low cost. Therefore, it is of great significance to extract bovine milk oligosaccharides from whey (including sweet whey, reconstituted desalted whey, microfiltration permeate of milk, etc.) on a large scale for use as a substitute for human milk oligosaccharides. At present, no substitute for human milk oligosaccharide has been obtained from milk of any animal origin to meet the commercial demand.

SUMMARY OF THE INVENTION

Purpose

In order to overcome the above shortcomings, the present disclosure provides a method for preparing milk oligosaccharides, and oligosaccharide powder and food prepared by the method. Animal milk oligosaccharides, especially bovine milk oligosaccharides, are new ingredients imitating human milk oligosaccharides, and are similar to human milk oligosaccharides in structure and biological function. Therefore, by applying bovine milk oligosaccharides in replacement of galactooligosaccharide and fructooligosaccharide in functional foods such as infant formula and special medicine, it can not only produce health value, but also has the opportunity to obtain higher additive values in dairy products that are not fully utilized at present.

Solutions

In order to achieve the purpose of the invention, the present disclosure provides technical solutions as follows:

In a first aspect, the present disclosure provides a method for preparing milk oligosaccharides, which comprises the following steps: performing ultrafiltration of whey liquid for at least three times, subjecting the ultrafiltration permeate to nanofiltration concentration for several times, then subjecting the nanofiltration retentate to chromatographic separation and purification, collecting chromatographic collection liquid containing sialyllactose while removing the fraction containing lactose, subjecting the collection to desalination and drying to obtain oligosaccharide powder.

Further, the procedure of collecting chromatographic collection liquid containing sialyllactose comprises: collecting chromatographic collection liquid into a tube and performing detections on the same, and combining the chromatographic collection liquid containing sialyllactose, in which the detection of sialyllactose is performed by the oligosaccharide detection method.

Further, the drying procedure is performed by freeze drying; optionally, the freeze-drying step comprises: loading the desalted concentrated retentate into a freeze dryer for drying; further optionally, the freeze-drying step comprises: setting the heating program of the vacuum freeze-drying as: 20° C. for 2 h, 40° C. for 1 h, and 55° C. until to the end, with the cold trap temperature being set at −50° C., and the vacuum degree at 2.50 to 6.50 MPa; and the drying procedure is not finished until the moisture content on dry basis is less than 5%.

Further, in the procedure of chromatographic separation and purification, the chromatographic packing material uses a cross-linked complex of agarose and dextran or a cross-linked agarose as the carrier; optionally, the carrier of the chromatographic packing material is Superdex 30 increase pre-loaded column, or DEAE-Sepharose Fast Flow, or Q-Sepharose Fast Flow; optionally, the procedure of chromatographic separation and purification comprises:

- loading the nanofiltration retentate into Superdex 30 increase pre-loaded column at a flow rate of 0.5 to 0.8 mL/min, and collecting the effluent at 0.5 to 2 mL/tube; optionally, the flow rate is 0.6 mL/min, and the collection of the effluent is performed at 1 mL/tube;
- or, loading the nanofiltration retentate into a 1.5 cm×20 cm DEAE-Sepharose FF column at a flow rate of 1 to 2 mL/min, and collecting the effluent at 0.5-1.5 mL/tube; optionally, the flow rate is 1.5 mL/min, and the collection of the effluent is performed at 1 mL/tube;
- or, loading the nanofiltration retentate into a 10 cm×50 cm Q-Sepharose FF column at a flow rate of 15 to 25 mL/min, and collecting the effluent at 40 to 60 mL/tube; optionally, the flow rate is 20 mL/min, and the collection of the effluent is performed at 50 mL/tube.

The chromatographic packing material used in the present disclosure has the advantages of heat resistance, pressure resistance, high resolution, high chemical stability, high flow rate, high load, ease to in-situ cleaning, reusability, low nonspecific adsorption, and high recovery rate, and is suitable for industrial scale production.

Further, the whey liquid is a by-product whey liquid produced during cheese manufacturing, or a whey liquid after the desalted whey powder is reconstituted, or a permeate prepared by microfiltration of skimmed animal milk, in which, optionally, the animal milk is bovine milk; and optionally, the mass ratio of the desalted whey powder to water is 1:4 to 20;

- optionally, the method of preparing the permeate from the animal milk by microfiltration comprises: subjecting the skimmed animal milk to microfiltration for at least three times to obtain the microfiltration permeate; optionally, the percentage content of fat in the skimmed animal milk is less than or equal to 0.1% by mass, and preferably is 0.02% to 0.1% by mass;
- optionally, the animal milk skimming procedure comprises: subjecting the raw milk to pasteurization and then cooling to 45 to 55° C. through a plate heat exchanger for skimming;
- optionally, the microfiltration for at least three times comprises: concentrating the skimmed animal milk through microfiltration until reaching 2 to 5 cycles of concentration to obtain the first microfiltration permeate; diluting the first microfiltration retentate with water, followed by concentrating through microfiltration until reaching 2 to 5 cycles of concentration to obtain the second microfiltration permeate; diluting the second microfiltration retentate with water, followed by concentrating through microfiltration until reaching 2 to 5 cycles of concentration to obtain the third microfiltration permeate, and so on; optionally, the microfiltration is performed five times; optionally, dilution with water is carried out until the quality is similar to that of the skimmed animal milk before microfiltration;
- optionally, in the concentration through microfiltration, the used microfiltration membrane has a pore diameter of 50 nm to 140 nm; optionally, a tubular ceramic membrane is used as the microfiltration membrane; the ceramic membrane has the advantages of high separation efficiency, stable effect, good chemical stability, acid and alkali resistance, organic solvent resistance, bacteria resistance, high temperature resistance, pollution resistance, high mechanical strength, and good regeneration performance, and the separation process is simple, has low energy consumption, and is easy in operation and maintenance, thus being an environmentally friendly technology.

Optionally, the microfiltration is performed under conditions as follows: the feed temperature is 45° C. to 55° C., the inlet pressure is 2 to 5 bar, the outlet pressure is 1 to 4 bar, the back pressure is 0.5 to 3 bar, and the membrane pressure difference is less than 3 bar. It is noted that if the pressure is too high, the membrane will be blocked seriously, and the concentration polarization will be accelerated, which will affect the permeability of bovine milk oligosaccharides. In addition, too large or too small membrane pressure difference will lead to low separation efficiency, time-consuming and energy-consuming, and susceptibility to microbial contamination.

In the present disclosure, the purpose of multiple microfiltrations of skimmed animal milk is to remove casein from the skimmed milk, so as to prevent contamination of the ultrafiltration membrane in the next stage, while separating more milk oligosaccharides.

Further, the ultrafiltration for at least three times comprises: concentrating the microfiltration permeate through ultrafiltration until reaching 2 to 7 cycles of concentration to obtain the first ultrafiltration permeate; diluting the first ultrafiltration retentate with water, followed by concentrating through ultrafiltration until reaching 2 to 7 cycles of concentration to obtain the second ultrafiltration permeate; diluting the second ultrafiltration retentate with water, followed by concentrating through ultrafiltration until reaching 2 to 7 cycles of concentration to obtain the third ultrafiltration permeate, and so on; optionally, the ultrafiltration is performed six times; optionally, the amount of water added for dilution is similar to the mass of ultrafiltration retentate to be diluted.

Further, in the ultrafiltration procedure, the used ultrafiltration membrane has a molecular weight cut-off of 5 kDa to 30 kDa; optionally, the ultrafiltration membrane is a composite tubular organic membrane. Organic membranes have the advantages of large effective membrane area, low price, low investment, uniform pore size distribution, and ease to operation and cleaning.

Further, the ultrafiltration is performed under conditions as follows: the feed temperature is 20° C. to 45° C., the inlet pressure is 6 to 9 bar, the outlet pressure is 5 to 8 bar; optionally, the membrane pressure difference is not more than 3 bar.

Further, the procedure of nanofiltration concentration for several times comprises: concentrating the ultrafiltration permeate through nanofiltration until reaching 2 to 13 cycles of concentration to obtain the first nanofiltration retentate; diluting the first nanofiltration retentate with water, followed by concentrating through nanofiltration until reaching 2 to 13 cycles of concentration to obtain the second nanofiltration retentate; diluting the second nanofiltration retentate with water, followed by concentrating through nanofiltration until reaching 2 to 13 cycles of concentration to obtain the third nanofiltration retentate, and so on; alternatively, the nanofiltration is performed six times; optionally, the amount of water added for dilution is similar to that of nanofiltration retentate to be diluted.

Further, in the nanofiltration procedure, the used nanofiltration membrane has a molecular weight cut-off of 100 Da to 3000 Da; optionally, the nanofiltration membrane used in the nanofiltration step is a composite tubular organic membrane.

Further, the nanofiltration is performed under conditions as follows: the feed temperature is 20° C. to 45° C., the inlet pressure is 16 to 20 bar, the outlet pressure is 14 to 18 bar; optionally, the membrane pressure difference is not more than 3 bar.

Further, the desalination is performed by nanofiltration or electrodialysis;

optionally, the desalination by nanofiltration comprises: separating the chromatographic collection liquid through nanofiltration, washing and filtering with deionized water until the conductivity does not decrease any longer, and concentrating to the minimum cycling volume of the device to obtain a concentrated nanofiltration retentate, at which time the nanofiltration concentration is finished; optionally, the nanofiltration membrane used in the desalination by nanofiltration has a molecular weight cut-off of 100 Da to 500 Da; optionally, the nanofiltration membrane used in the desalination by nanofiltration is a composite tubular organic membrane; optionally, the desalination by nanofiltration is performed under the conditions as follows: the feed temperature is 20° C. to 45° C., the inlet pressure is 10 to 15 bar, and the outlet pressure is 5 to 10 bar; optionally, the membrane pressure difference is not more than 3 bar;

optionally, the electrodialysis procedure comprises: loading the chromatographic collection liquid into an electrodialysis device for dialysis until the electric current does not change any longer, at which time the desalination is finished; optionally, the electrodialysis is performed under conditions as follows: regulation voltage: 8 V, feed flow rate: 50 L/h, ultra-pure water flow rate: 50 L/h, polar liquid flow rate: 45 L/h.

Further, the method of the present application further comprises: concentrating the nanofiltration permeate by reverse osmosis to generate deionized water suitable for the process;

optionally, the concentration by reverse osmosis specifically comprises: concentrating the nanofiltration permeate by reverse osmosis to the minimum cycling volume of the device to obtain a reverse osmosis permeate, at which time the reverse osmosis is finished;

optionally, in the reverse osmosis procedure, the used membrane has a stable desalination rate of 99.5%;

optionally, the reverse osmosis is performed under conditions as follows: the feed temperature is 20° C. to 45° C., the inlet pressure is 16 to 20 bar, the outlet pressure is 14 to 18 bar; optionally, the membrane pressure difference is not more than 3 bar.

Further, the procedures of ultrafiltration, nanofiltration, and reverse osmosis adopt an integrated ultrafiltration-nanofiltration-reverse osmosis device.

On the other hand, the invention provides an oligosaccharide powder, which is a milk oligosaccharide powder prepared by the present method; optionally, the milk oligosaccharide powder comprises sialyllactose; optionally, the sialyllactose comprises 3'-sialyllactose and 6'-sialyllactose; optionally, the total percentage content of 3'-sialyllactose and 6'-sialyllactose in the milk oligosaccharide powder is not less than 25% by mass; further optionally, the total percentage content of 3'-sialyllactose and 6'-sialyllactose in the milk oligosaccharide powder is not less than 50% by mass.

In another aspect, the invention provides an oligosaccharide food or health product, which comprises the oligosaccharide powder prepared by the present method or the oligosaccharide powder as described above.

The oligosaccharide food or health product comprises an oligosaccharide powder prepared by the present method; optionally, the oligosaccharide powder comprises sialyllactose, which optionally comprises 3'-sialyllactose and 6'-sialyllactose.

Beneficial Effects (1) According to the present application, ultrafiltration is performed at least three times, which can effectively remove whey protein from whey liquid, avoid polluting the nanofiltration membrane in the next stage, and separate more milk oligosaccharides; multiple nanofiltration concentrations have been applied, which can remove water and some lactose, minimize the interference of non-prebiotic components, while increasing the dry matter content; separation by chromatography is to remove residual lactose, so as to obtain a product mainly containing sialyloligosaccharides, and desalination is applied to remove NaCl introduced in chromatography.

(2) The milk oligosaccharides prepared by the present method and the food product containing the milk oligosaccharide comprise basically natural bovine milk oligosaccharides, which are light yellow or white in color, light in flavor, uniform in size, and have good thermal stability and solubility. The milk oligosaccharides mainly comprise 3'-sialyllactose and 6'-sialyllactose.

(3) According to the present application, the milk oligosaccharide powder is obtained by microfiltration, ultrafiltration, nanofiltration, reverse osmosis, chromatography, and freeze-drying technologies, which do not involve fermentation and enzymatic conversion as compared with the traditional bioengineering technology, and thereby remain the natural structure of milk oligosaccharides. Additionally, it has excellent processing quality characteristics and pure flavor, and shows wide application prospects in food industry.

BRIEF DESCRIPTION OF THE DRAWINGS

One or more examples are exemplified by the pictures in the accompanying drawings that correspond thereto and are not intended to be limiting of the embodiments. As used herein, the word "exemplary" means "serving as an example, embodiment, or illustrative". Any embodiment described herein as "exemplary" is not necessarily to be construed as superior or better than other embodiments.

DETAILED DESCRIPTION OF THE INVENTION

Figure 1:
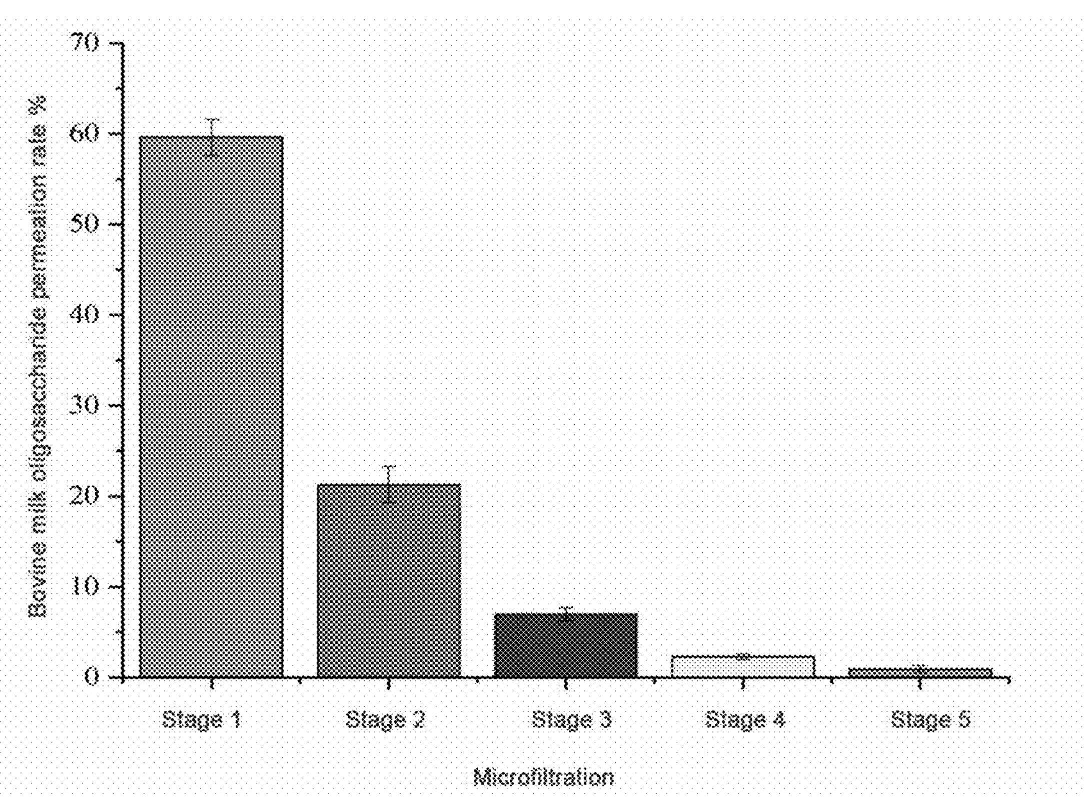
FIG. 1 is a histogram showing bovine milk oligosaccharide permeation rate for each stage of the microfiltration procedure in Example 1 of the present application.

In order to make the purpose, technical solutions and advantages of the invention clearer, the technical solutions in the embodiments of the invention will be described clearly and completely, obviously, the described embodiments are some of the embodiments of the present invention, but not all of them. Based on the embodiments of the present invention, all other embodiments obtained by those of ordinary skill in the art without creative work are within the scope of the present invention.

In addition, in order to better explain the present invention, a lot of specific details are given in the following embodiments. It will be understood by those skilled in the art that the present invention may be practiced without certain specific details. In some embodiments, materials, elements, methods, means, etc., well known to those skilled in the art, are not described in detail so as to highlight the spirit of the present invention.

Throughout the specification and claims, the term "comprising" or variations thereof, such as "including" or "containing", will be understood to include the stated components and not to exclude other elements or other components, unless expressly indicated otherwise.

There is no cross relationship between the separately mentioned term "lactose" and the term "sialyllactose" in the present disclosure. The separately mentioned term "lactose" in the present disclosure refers to 1,4-galactoside glucose, while the term "sialyllactose" belongs to prebiotic oligosaccharides. The oligosaccharides separated from whey liquid in the present application mainly comprise sialyllactose.

The present disclosure provides a method for preparing milk oligosaccharides by using whey liquid as raw material, which can be originated from the following three sources: 1) whey liquid as a by-product produced during cheese manufacturing; 2) whey liquid obtained after reconstitution of desalted whey powder; 3) the permeate prepared by microfiltration of the skimmed animal milk (usually bovine milk);

Among them, whey liquid as a by-product produced during cheese manufacturing, or whey liquid obtained after reconstitution of desalted whey powder can be subjected to ultrafiltration directly or after a simple filtration; generally, the whey liquid obtained after reconstitution of desalted whey powder is prepared by using desalted whey powder and water at the mass ratio of 1:4 to 20.

In the following examples and comparative examples, lactose and bovine milk oligosaccharides are detected as follows:

The method for detecting bovine milk oligosaccharides is as follows: diluting skimmed milk by 100 times, diluting the permeate by 2 times, after passing through 0.22 μm nylon filter membrane, taking 100 μL of stock solution or 100 μL of the separated oligosaccharide sample, to which 50 μL of a 0.5 M solution of 2-aminobenzamide (serving as a derivative reagent) and a 1 M solution of 2-methylpyridine borane complex (serving as a reductive amination reagent for labelling saccharides) are added respectively, after mixing evenly, carrying out derivation at 65° C. for 2.5 h, then cooling to room temperature, and loading the same into a liquid vial for detection, wherein both the solution of 2-aminobenzamide and the solution of 2-methylpyridine borane complex use a mixture solvent of dimethyl sulfoxide and acetic acid in a volume ratio of 85:15. Among them, the mobile phase is 100 mmol ammonium formate solution (pH=4.5) and acetonitrile solution. The column is Waters acquity UPLC glycan BEH Amide column (2.1 mm×150 mm, 1.7 μm), and the column temperature is set as 52° C. The excitation and emission wavelengths of the fluorescence detector are 250 nm and 425 nm, respectively.

The method for detecting lactose is as follows: diluting skimmed milk by 10000 times, diluting the permeate by 100 to 5000 times, diluting the retentate by 100 to 5000 times, taking 100 μL of each diluted sample, to which 50 μL of a 0.5 M solution of 2-aminobenzamide (serving as a derivative reagent) and a 1 M solution of 2-methylpyridine borane complex (serving as a reductive amination reagent for labelling saccharides) are added respectively, after mixing evenly, carrying out derivation at 65° C. for 2.5 h, then cooling to room temperature, and loading the same into a liquid vial for detection, wherein both the solution of 2-aminobenzamide and the solution of 2-methylpyridine borane complex use a mixture solvent of dimethyl sulfoxide and acetic acid in a volume ratio of 85:15. Among them, the mobile phase is 100 mmol ammonium formate solution (pH=4.5) and acetonitrile solution. The column is Waters acquity UPLC glycan BEH Amide column (2.1 mm×150 mm, 1.7 μm), and the column temperature is set at 52° C. The excitation and emission wavelengths of the fluorescence detector are 250 nm and 425 nm, respectively.

SDS-PAGE method: diluting a sample, mixing it with 2×sample buffer in a volume ratio of 1:1, and placing the mixture into a boiling water bath for 5 min, and then taking 10 μL of the mixture for loading. The sample voltage is set at 140 V, and electrophoresis is finished when the lower edge of bromophenol blue was 1 cm away from the bottom of the gel. After electrophoresis, Coomassie Brilliant Blue G250 dye is used for dyeing for 1 hour, and a decolorization solution is used for decoloring for 4 hours until the bands are clear, and then imaging is taken. Among them, the electrophoresis support medium is composed of a gradient gel, such as a precast gel with a concentration of 6~ 18%. Among them, SDS-PAGE running solution, the precast gel, the staining solution and the decolorizing solution are all purchased from Nanjing Kingsley Co., Ltd.

Example 1

When taking the permeate prepared by microfiltration of skimmed animal milk (generally bovine milk) as the whey liquid, the preparation method was as follows.

In general, raw milk was subjected to pasteurization and skimmed firstly. Specifically, the raw milk was subjected to pasteurization, comprising: heating raw milk at 72 to 85° C. for 15 to 30 s to inhibit the growth and reproduction of microorganisms throughout the production process, while preventing whey protein from denaturing. After sterilization, the raw milk was cooled to 45° C. to 55° C. by a plate heat exchanger for skimming, and optionally the skimmed milk was cooled to 1 to 4° C. for storage. The temporarily stored skimmed bovine milk needed to be consumed within 6 to 48 hours, and when processed, it was heated to 45° C. to 55° C. by a plate heat exchanger; in the above method, the percentage content of fat in the skimmed bovine milk was less than 0.1% by mass, such as 0.02% to 0.1% by mass, so as to prevent fat globules from blocking microfiltration pores.

One embodiment of microfiltration of skimmed bovine milk was operated as follows:

(1) microfiltration concentration for five times: loading 48 L skimmed bovine milk into a microfiltration device, and stabilizing the temperature at 50° C. by using the refrigerant device; using a tubular ceramic membrane with pore size of 100 nm as the membrane material; wherein, the inlet pressure was 5 bar, the outlet pressure was 4 bar, and the back pressure was 3 bar.

The skimmed bovine milk was concentrated through microfiltration until reaching 3 cycles of concentration to obtain the first microfiltration permeate, at which time the first microfiltration was finished;

32 kg of deionized water was added at one time until the total mass of the added water and the first microfiltration retentate was equal to that of the original skimmed bovine milk, and then the diluted first microfiltration retentate was concentrated through microfiltration until reaching 3 cycles of concentration to obtain the second microfiltration permeate, at which time the second microfiltration was finished;

32 kg of deionized water was again added at one time until the total mass of the added water and the second microfiltration retentate was equal to that of the original skimmed bovine milk, and then the diluted second microfiltration retentate was concentrated through microfiltration until reaching 3 cycles of concentration to obtain the third microfiltration permeate, at which time the third microfiltration was finished;

32 kg of deionized water was again added at one time until the total mass of the added water and the third microfiltration retentate was equal to that of the original skimmed bovine milk, and then the diluted third microfiltration retentate was concentrated through microfiltration until reaching 3 cycles of concentration to obtain the fourth microfiltration permeate, at which time the fourth microfiltration was finished;

32 kg of deionized water was again added at one time until the total mass of the added water and the fourth microfiltration retentate was equal to that of the original skimmed bovine milk, and then the diluted fourth microfiltration retentate was concentrated through microfiltration until reaching 3 cycles of concentration, at which time the fifth microfiltration was finished, and a total of 160 kg microfiltration permeate was obtained.

The skimmed bovine milk, retentates, and permeates obtained during the membrane separation were detected for oligosaccharides and lactose, and the results were shown in FIG. 1.

Figure 2:
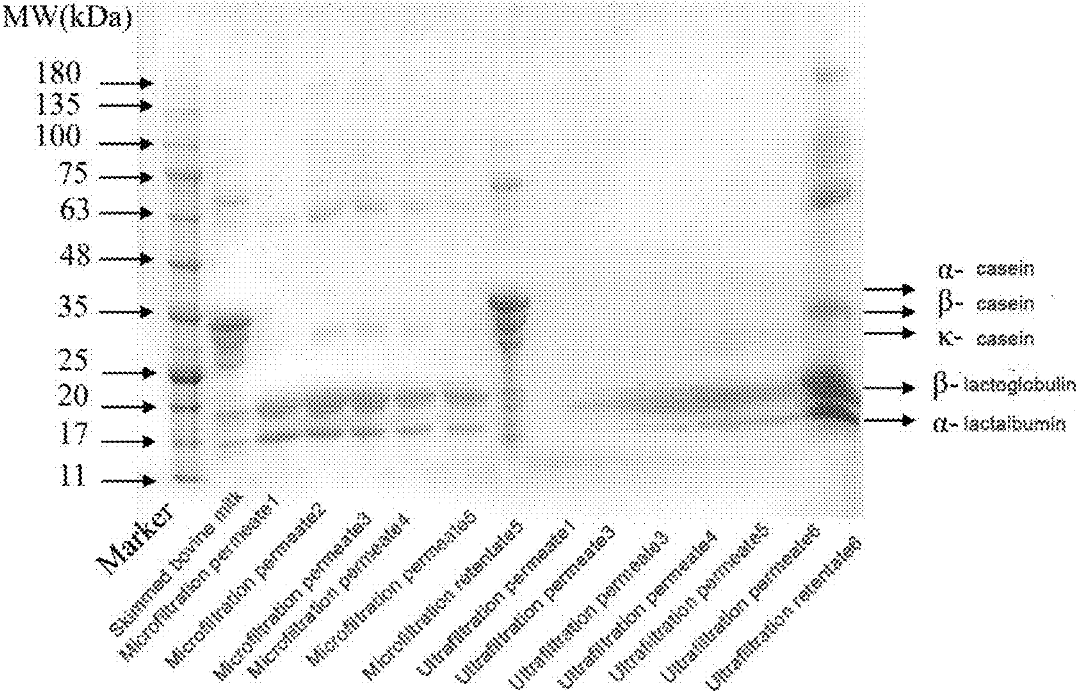
FIG. 2 shows the results of sodium dodecyl sulphate-polyacrylamide gel electrophoresis of the skimmed bovine milk, microfiltration permeates and microfiltration retentates, ultrafiltration permeates and ultrafiltration retentates obtained during the separation of the skimmed bovine milk by membrane technology, as recited in Examples 1 and 2 of the present application.

In addition, the skimmed bovine milk, the microfiltration retentates, and the first, second, third, fourth, and fifth microfiltration permeates obtained during the membrane separation were subjected to SDS-PAGE electrophoresis, wherein the skimmed milk was diluted 10 times, the microfiltration retentate was diluted 26 times, and the microfiltration permeate was diluted 2 times, and the results were shown in FIG. 2.

As seen from FIG. 1, compared with the skimmed bovine milk, the microfiltration permeate contained 91.05% bovine milk oligosaccharides. FIG. 2 showed that casein had barely penetrated. This phenomenon fully proved that bovine milk oligosaccharides and whey protein can permeate through the ceramic membrane, thereby realizing their separation from casein, and reducing the pollution of the ultrafiltration membrane in the next step.

Example 2. Ultrafiltration Concentration for Six Times

160 L of microfiltration permeate obtained in Example 1 was loaded into an integrated ultrafiltration-nanofiltration-reverse osmosis device, or 8 kg of desalted whey powder was dissolved in deionized water to a constant volume of 160 L and then loaded into an integrated ultrafiltration-nanofiltration-reverse osmosis device, the reconstituted desalted whey powder solution was subjected to the following ultrafiltration operations, respectively;

the solution was concentrated through ultrafiltration until reaching 6.4 cycles of concentration to obtain the first ultrafiltration permeate, at which time the first ultrafiltration was finished;

25 kg of deionized water was added at one time, and then ultrafiltration concentration was performed until reaching 2 cycles of concentration to obtain the second ultrafiltration permeate, at which time the second ultrafiltration was finished;

25 kg of deionized water was again added at one time, and then ultrafiltration concentration was performed until reaching 2 cycles of concentration to obtain the third ultrafiltration permeate, at which time the third ultrafiltration was finished;

25 kg of deionized water was again added at one time, and then ultrafiltration concentration was performed until reaching 2 cycles of concentration to obtain the fourth ultrafiltration permeate, at which time the fourth ultrafiltration was finished;

25 kg of deionized water was again added at one time, and then ultrafiltration concentration was performed until reaching 2 cycles of concentration to obtain the fifth ultrafiltration permeate, at which time the fifth ultrafiltration was finished;

25 kg of deionized water was again added at one time, and then ultrafiltration concentration was performed until reaching 2 cycles of concentration, at which time the sixth ultrafiltration was finished, and a total of 260 kg of ultrafiltration permeate was obtained.

The molecular weight cut-off of the ultrafiltration membrane used in this example was 5 kDa to 30 kDa; optionally, the ultrafiltration membrane was a composite tubular organic membrane.

Figure 3:
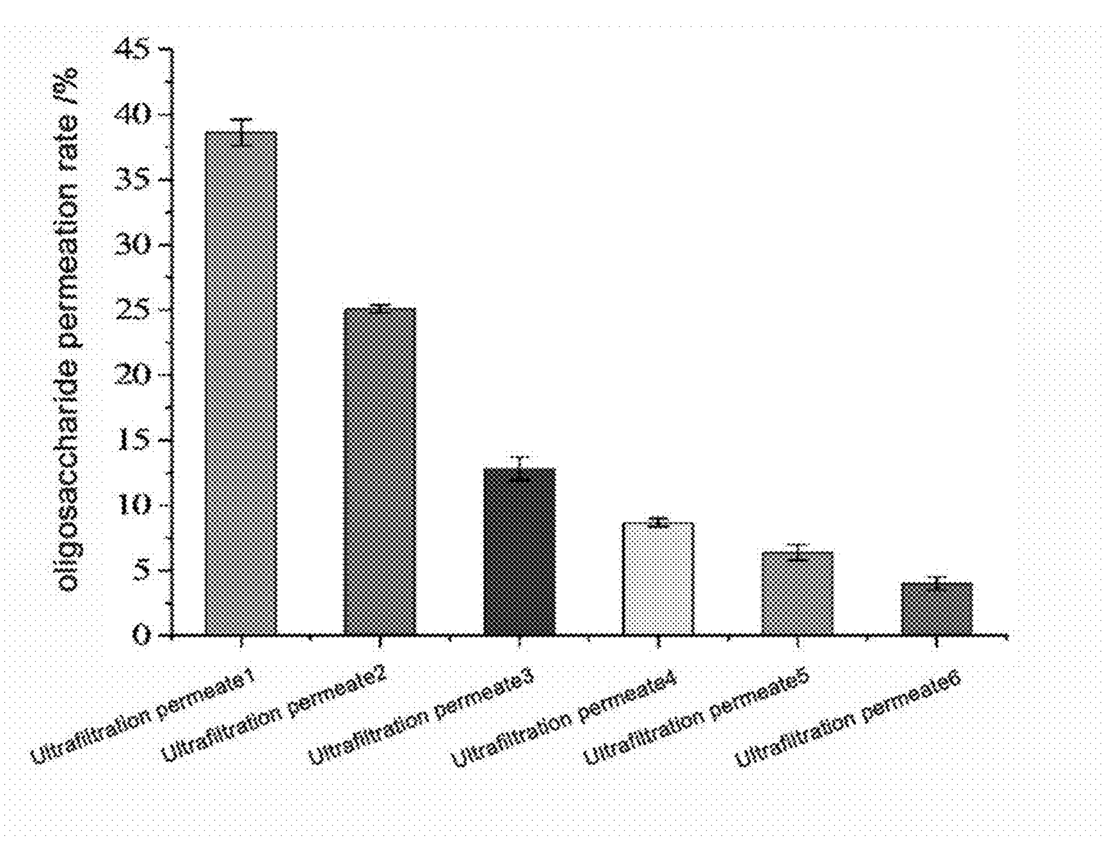
FIG. 3 is a histogram showing bovine milk oligosaccharide permeation rate for each stage of the ultrafiltration procedure of reconstituted desalted whey powder solution in Example 2 of the present application.

The reconstituted desalted whey powder solution, ultrafiltration permeates, and ultrafiltration retentates were subjected to oligosaccharide detection, lactose detection, and SDS-PAGE detection, wherein the ultrafiltration retentate was diluted 4 times, and the oligosaccharide detection results were shown in FIG. 3. SDS-PAGE detection results of the reconstituted desalted whey powder solution and its ultrafiltration permeates and retentates were shown in FIG. 4.

Figure 4:
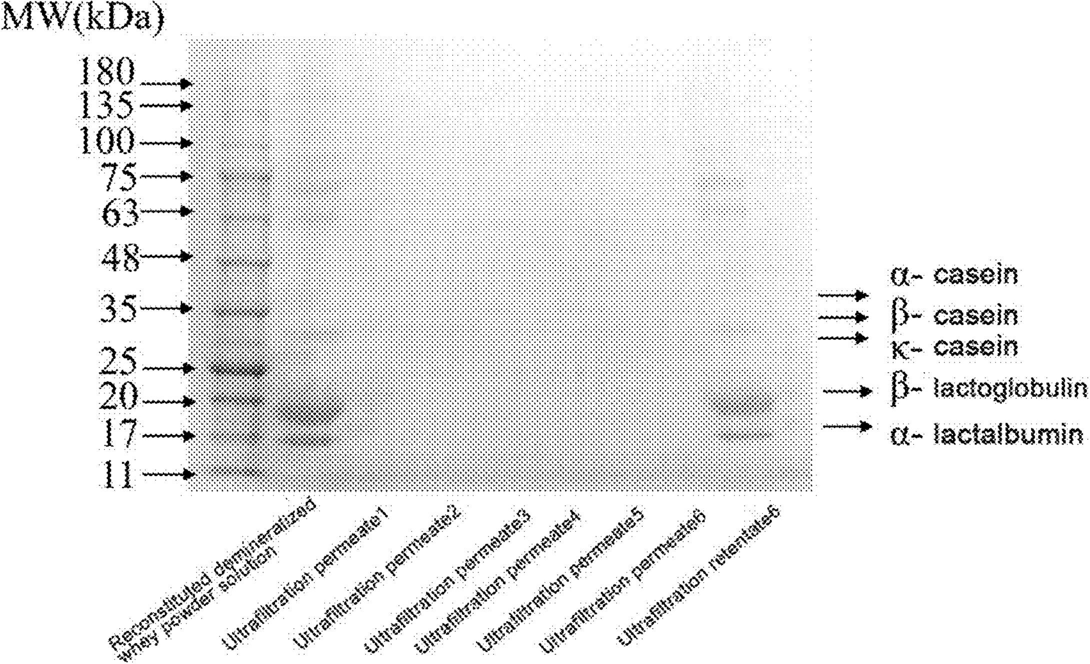
FIG. 4 shows the results of sodium dodecyl sulphate-polyacrylamide gel electrophoresis of reconstituted desalted whey powder solution, ultrafiltration permeates, and ultrafiltration retentates obtained during the separation of the reconstituted desalted whey powder solution by membrane technology, as recited in Example 2 of the present application.

As can be seen from FIG. 3, the ultrafiltration permeate from the reconstituted desalted whey powder solution contained 96.92% bovine milk oligosaccharides, which, in combination with FIG. 4, showed that whey protein was retained to a large extent, fully proving that the used ultrafiltration organic membrane can separate bovine milk oligosaccharides from whey protein and reduce pollution on nanofiltration membrane in the next step.

After ultrafiltration of the microfiltration permeate of skimmed bovine milk, the content of bovine milk oligosaccharides in the ultrafiltration permeate can also reach more than 96%, which was similar to the composition of the ultrafiltration permeate from the reconstituted desalted whey powder solution. Moreover, the desalted whey powder was at a far lower cost than raw milk, and was easy to obtain and store. Therefore, the ultrafiltration permeate from the reconstituted desalted whey powder solution was taken as an example for the next procedure.

Example 3. Nanofiltration Concentration for Six Times 260 kg of ultrafiltration permeate of the reconstituted desalted whey powder solution obtained in Example 2 was loaded into an ultrafiltration-nanofiltration-reverse osmosis device to remove excess water, and the ultrafiltration permeate was concentrated through nanofiltration until reaching 13 cycles of concentration to obtain the first nanofiltration retentate, at which time the first nanofiltration was finished;

20 kg of deionized water was added at one time, and nanofiltration concentration was performed until reaching 2 cycles of concentration to obtain the second nanofiltration retentate, at which time the second nanofiltration was finished;

20 kg of deionized water was again added at one time, and nanofiltration concentration was performed until reaching 2 cycles of concentration to obtain the third nanofiltration retentate, at which time the third nanofiltration was finished;

20 kg of deionized water was again added at one time, and nanofiltration concentration was performed until reaching 2 cycles of concentration to obtain the fourth nanofiltration retentate, at which time the fourth nanofiltration was finished;

20 kg of deionized water was again added at one time, and nanofiltration concentration was performed until reaching 2 cycles of concentration to obtain the fifth nanofiltration retentate, at which time the fifth nanofiltration was finished;

20 kg of deionized water was again added at one time, and nanofiltration concentration was performed until reaching 2 cycles of concentration, at which time the sixth nanofiltration was finished, and a total of 17 kg nanofiltration retentate was obtained.

The molecular weight cut-off of the nanofiltration membrane used in this example was 100 Da to 3000 Da; optionally, the nanofiltration membrane was a composite tubular organic membrane.

Figure 5:
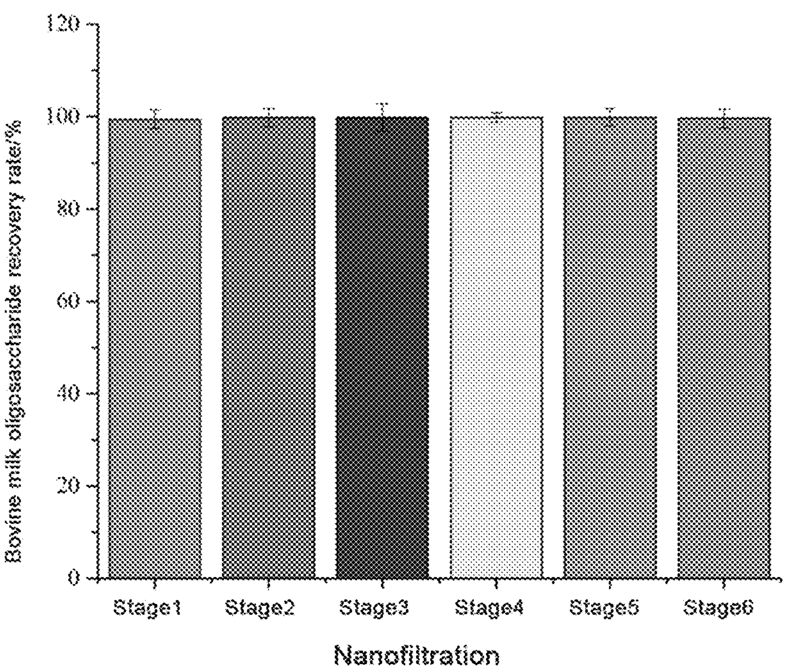
FIG. 5 is a histogram showing bovine milk oligosaccharide retention rate for each stage of the nanofiltration procedure in Example 3 of the present application.

The nanofiltration retentates were subjected to oligosaccharide detection, and the results were shown in FIG. 5. As can be seen from FIG. 5, 98.30% bovine milk oligosaccharides were retained in the nanofiltration retentate when the ultrafiltration permeate was concentrated by nanofiltration.

Example 4. Primary Reverse Osmosis Concentration

The nanofiltration permeate obtained in Example 3 was concentrated by reverse osmosis in order to obtain deionized water, which was used to supplement the water demand in the process, so as to achieve green production demonstration.

340 L of the nanofiltration permeate obtained in Example 3 was loaded into an ultrafiltration-nanofiltration-reverse osmosis device, and reverse osmosis concentration was carried out for 20 cycles to obtain the primary reverse osmosis permeate, at which time the reverse osmosis concentration was finished.

The results showed that the conductivity of water produced by the reverse osmosis was 2 to 5 uS/cm, which can meet the water demand in the process, can be circulated, and has no pollution and no harmful substances residue throughout the process.

Example 5. Separation and Purification by Chromatography

Figure 6:
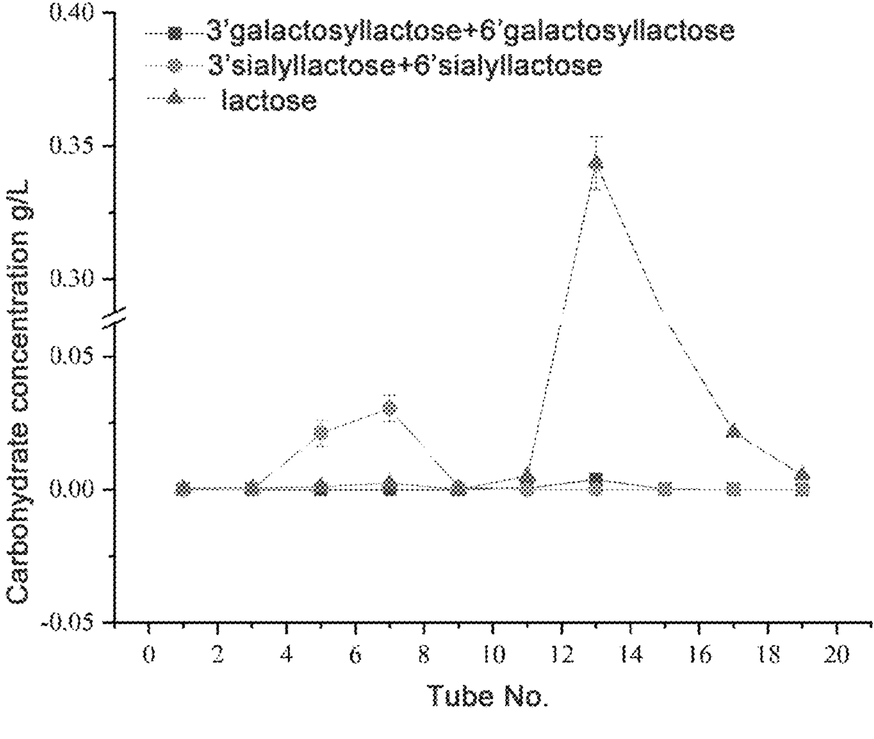
FIG. 6 is a diagram showing the separation and purification of nanofiltration retentate by Superdex 30 increase pre-loaded column in Example 5 of the present application.
Figure 7:
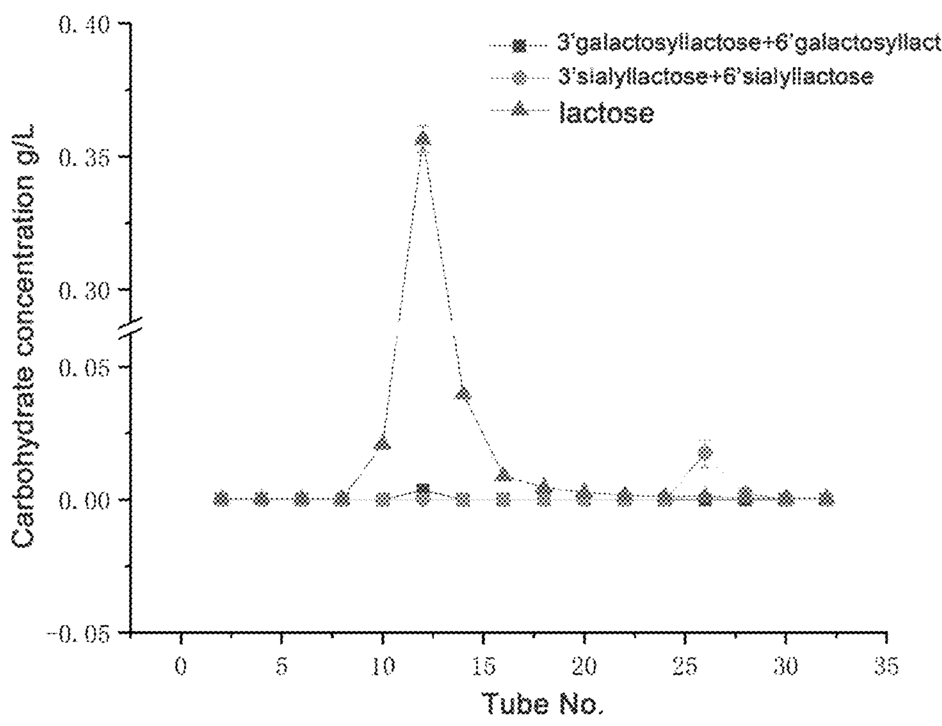
FIG. 7 is a diagram showing the separation and purification of nanofiltration retentate by DEAE-Sepharose FF in Example 5 of the present application.
Figure 8:
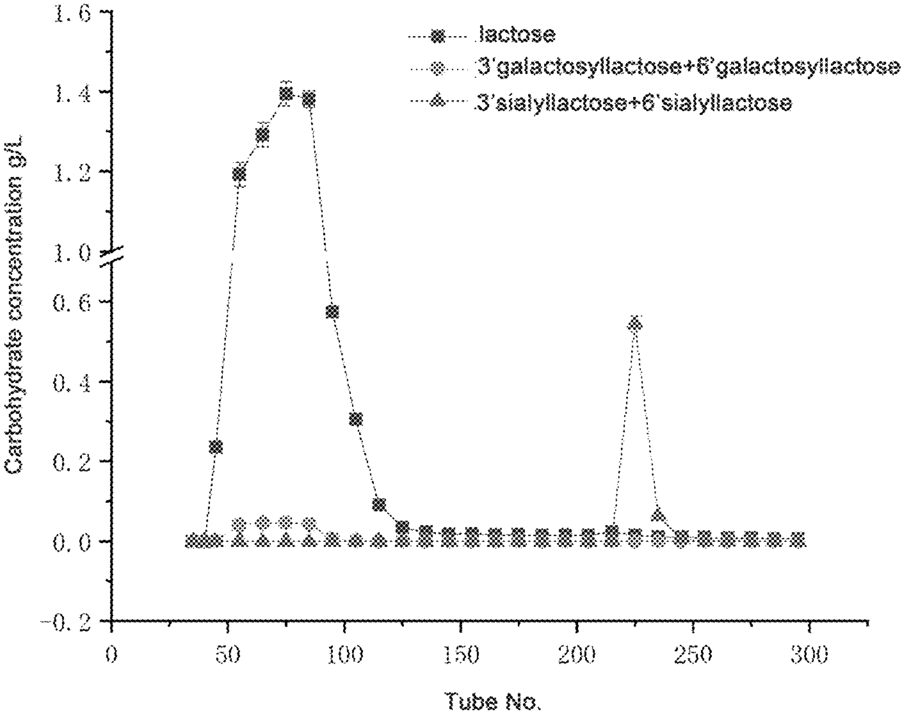
FIG. 8 is a diagram showing the separation and purification of nanofiltration retentate by Q-Sepharose FF in Example 5 of the present application.

The nanofiltration retentate obtained in Example 3 was subjected to chromatographic separation to remove non-prebiotic substances (lactose). The chromatographic columns used for three separation methods were Superdex 30 increase pre-loaded column, DEAE-Sepharose FF, and Q-Sepharose FF, respectively, all of which were purchased from Stovan Company.

a) 500 μL of nanofiltration retentate obtained in Example 3 was loaded into Superdex 30 increase pre-loaded column for chromatographic separation, wherein, the flow rate was 0.6 mL/min, and the effluent was collected into tube at 1 mL/tube; the collection in each tube was subjected to oligosaccharide detection and lactose detection, and the results were shown in FIG. 6.

b) 500 μL of nanofiltration retentate obtained in Example 3 was loaded into DEAE-Sepharose FF chromatographic column (1.5 cm×20 cm) for chromatographic separation, wherein, the flow rate was 1.5 mL/min, and the effluent was collected into tube at 1 mL/tube; the collection in each tube was subjected to oligosaccharide detection and lactose detection, and the results were shown in FIG. 7.

c) 1 L of nanofiltration retentate obtained in Example 3 was loaded into Q-Sepharose FF (10 cm×50 cm) for chromatographic separation, wherein, the flow rate was 20 mL/min, and the effluent was collected into tube at 50 mL/tube; the collection in each tube was subjected to oligosaccharide detection and lactose detection, and the detection results were shown in FIG. 8.

As can be seen from FIGS. 6-8, these three separation methods can achieve the effective separation of sialyllactose from non-prebiotic substances (lactose), and enable the industrialization of milk oligosaccharides.

In the research and development process, the inventors of the present invention also attempted to separate oligosaccharides from lactose by ANX-Sepharose chromatography, CM-Sepharose FF chromatography, QXL-Sepharose chromatography, SP-Sepharose FF chromatography and SP-Sepharose XL chromatography, but the effects thereof were not ideal, as shown in Comparative example 1 for details.

Figure 9:
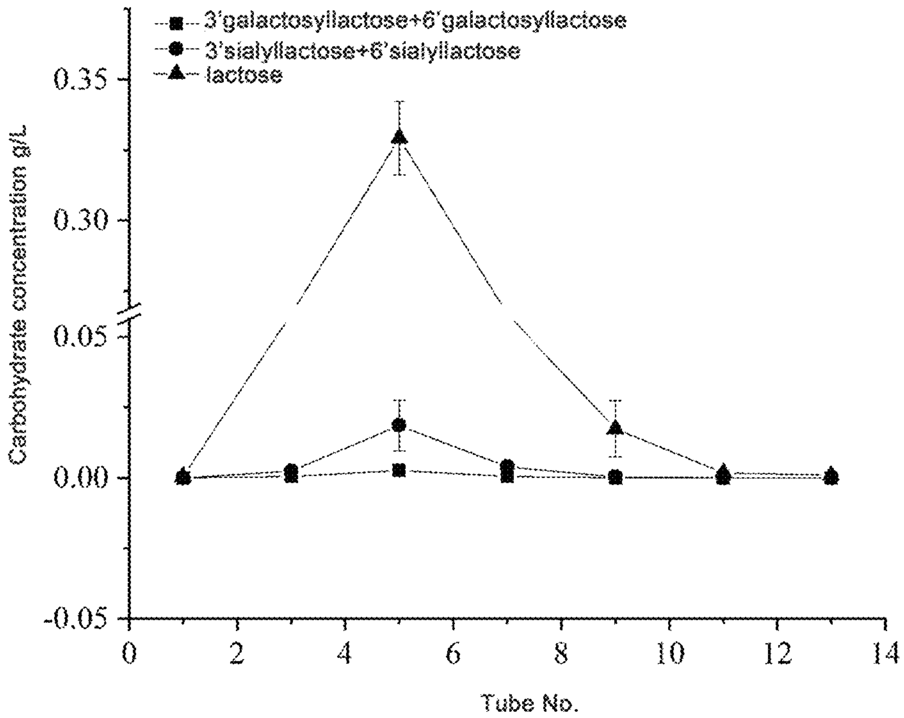
FIG. 9 is a diagram showing the separation and purification of nanofiltration retentate by ANX-Sepharose chromatography in Comparative example 1.

Comparative Example 1. Other Separation and Purification Procedures by Chromatography 1) 100 μL of nanofiltration retentate obtained in Example 3 was loaded into ANX-Sepharose chromatographic column (0.7 cm×2.5 cm) for chromatographic separation, wherein, the flow rate was 0.1 mL/min, and the effluent was collected into tube at 0.2 mL/tube; the effluent in each tube was subjected to oligosaccharide detection and lactose detection, and the results were shown in FIG. 9.

Figure 10:
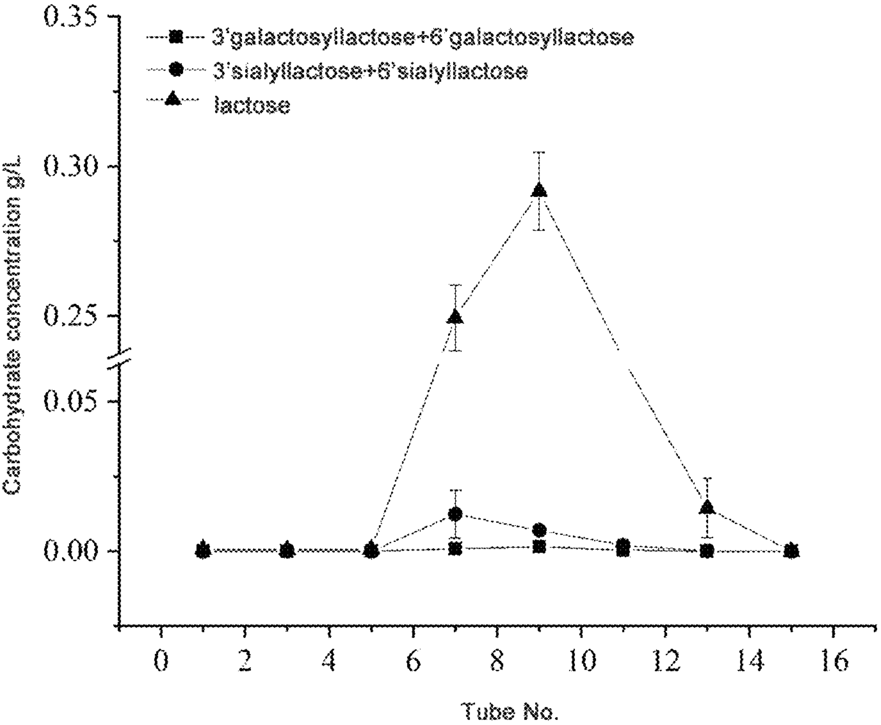
FIG. 10 is a diagram showing the separation and purification of nanofiltration retentate by CM-Sepharose FF chromatography in Comparative example 1 of the present invention.

2) 100 μL of nanofiltration retentate obtained in Example 3 was loaded into CM-Sepharose FF chromatographic column (0.7 cm×2.5 cm) for chromatographic separation, wherein, the flow rate was 0.1 mL/min, and the effluent was collected into tube at 0.2 mL/tube; the effluent in each tube was subjected to oligosaccharide detection and lactose detection, and the results were shown in FIG. 10.

Figure 11:
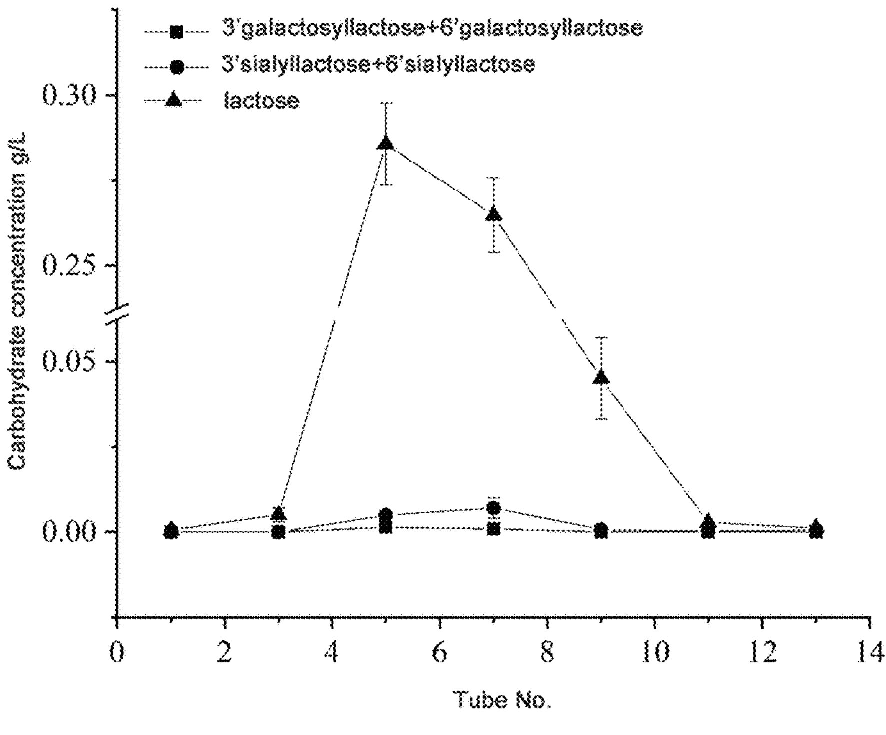
FIG. 11 is a diagram showing the separation and purification of nanofiltration retentate by QXL-Sepharose chromatography in Comparative example 1 of the present invention.

3) 100 μL of nanofiltration retentate obtained in Example 3 was loaded into QXL-Sepharose chromatographic column (0.7 cm×2.5 cm) for chromatographic separation, wherein, the flow rate was 0.1 mL/min, and the effluent was collected into tube at 0.2 mL/tube; the effluent in each tube was subjected to oligosaccharide detection and lactose detection, and the results were shown in FIG. 11.

Figure 12:
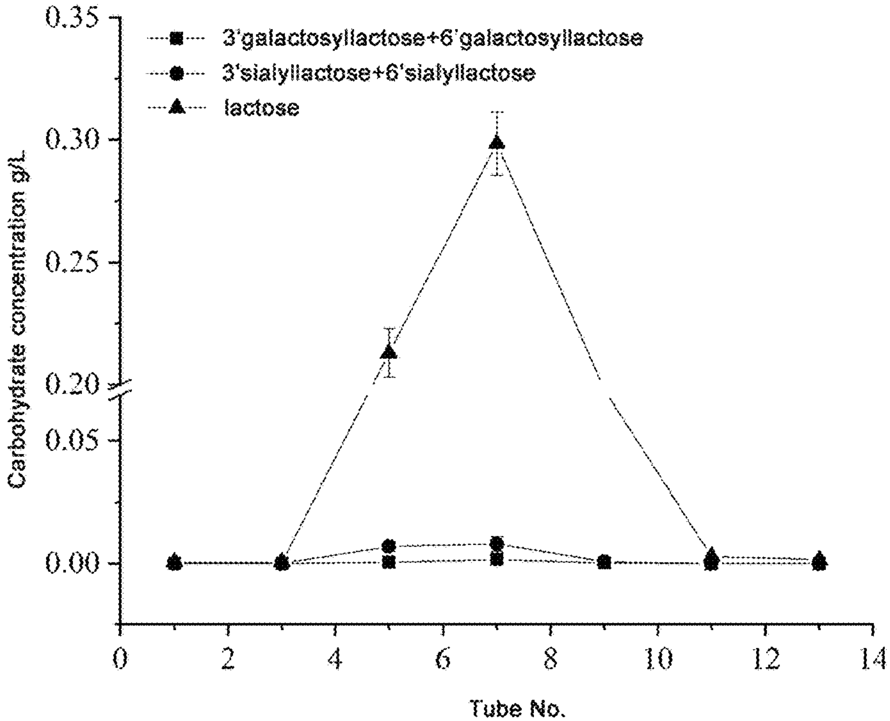
FIG. 12 is a diagram showing the separation and purification of nanofiltration retentate by SP-Sepharose FF chromatography in Comparative example 1.

4) 100 μL of nanofiltration retentate obtained in Example 3 was loaded into SP-Sepharose FF chromatographic column (0.7 cm×2.5 cm) for chromatographic separation, wherein, the flow rate was 0.1 mL/min, and the effluent was collected into tube at 0.2 mL/tube; the effluent in each tube was subjected to oligosaccharide detection and lactose detection, and the results were shown in FIG. 12.

Figure 13:
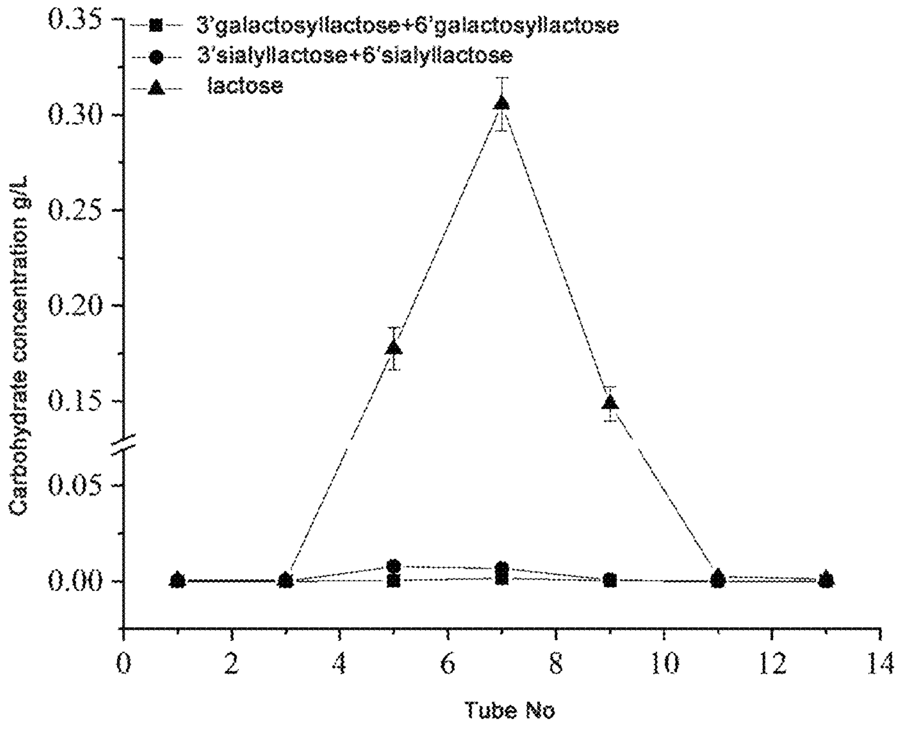
FIG. 13 is a diagram showing the separation and purification of nanofiltration retentate by SP-Sepharose XL chromatography in Comparative example 1 of the present invention.

5) 100 μL of nanofiltration retentate obtained in Example 3 was loaded into SP-Sepharose XL chromatographic column (0.7 cm×2.5 cm) for chromatographic separation, wherein, the flow rate was 0.1 mL/min, and the effluent was collected into tube at 0.2 mL/tube; the effluent in each tube was subjected to oligosaccharide detection and lactose detection, and the results were shown in FIG. 13.

As can be seen from FIGS. 9-13, effective separation of sialyllactose from non-prebiotic substances cannot be achieved by applying the following five ion chromatographic packings: ANX-Sepharose chromatography, CM-Sepharose FF chromatography, QXL-Sepharose chromatography, SP-Sepharose FF chromatography, and SP-Sepharose XL chromatography.

The inventors of the present invention also attempted to perform other separation and purification procedures in the research and development process, as shown in Comparative examples 2 to 4 for details.

Comparative Example 2. Removal of Lactose by Activated Carbon Adsorption

The nanofiltration retentate in Example 3 was subjected to freeze-drying to obtain a crude milk oligosaccharide powder, 500 mg of the obtained powder and 3 g activated carbon were dissolved in 100 mL of different concentrations of ethanol solutions (5%, 10%, and 15%) to test the optimum concentration for BMO adsorption and lactose desorption. After stirring for 30 minutes, the mixture was filtered under vacuum through Whatman No. 1 filter paper and the activated carbon was washed with 25 mL of the corresponding ethanol solution. Milk oligosaccharides were desorbed from activated carbon with 100 mL ethanol solution (50%, v/v). The mixture was stirred for 30 min and filtered as described above. The filtrate was evaporated at 50° C. under vacuum and the solid was dissolved in 5 mL deionized water. Activated carbon used in this comparative example was purchased from Sigma Aldrich Company.

Figure 14:
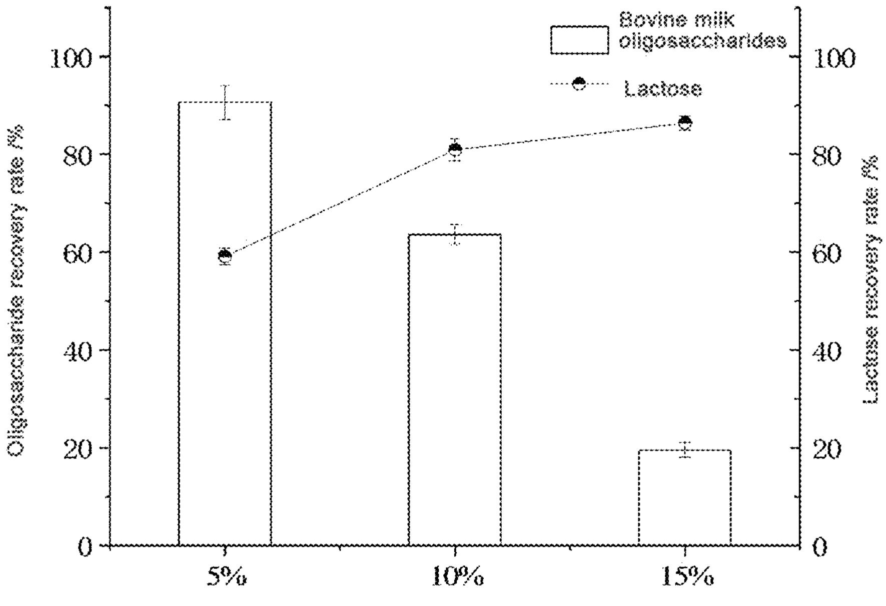
FIG. 14 shows the recovery rate of oligosaccharides and the removal rate of lactose by activated carbon in Comparative example 2.

Oligosaccharide detection and lactose detection were carried out, and the results were shown in FIG. 14, which indicated that the adsorption by activated carbon in this comparative example cannot effectively remove lactose.

Comparative Example 3. Removal of Lactose by Dialysis Bag

The nanofiltration retentate in Example 3 were loaded into dialysis bags with molecular weights of 100-500 Da and 500-1000 Da, respectively, for dialyzing with deionized water at 4° C. for 48 hours. The dialysis bags used in the comparative example were purchased from Shanghai Yuanye Co., Ltd.

Figure 15:
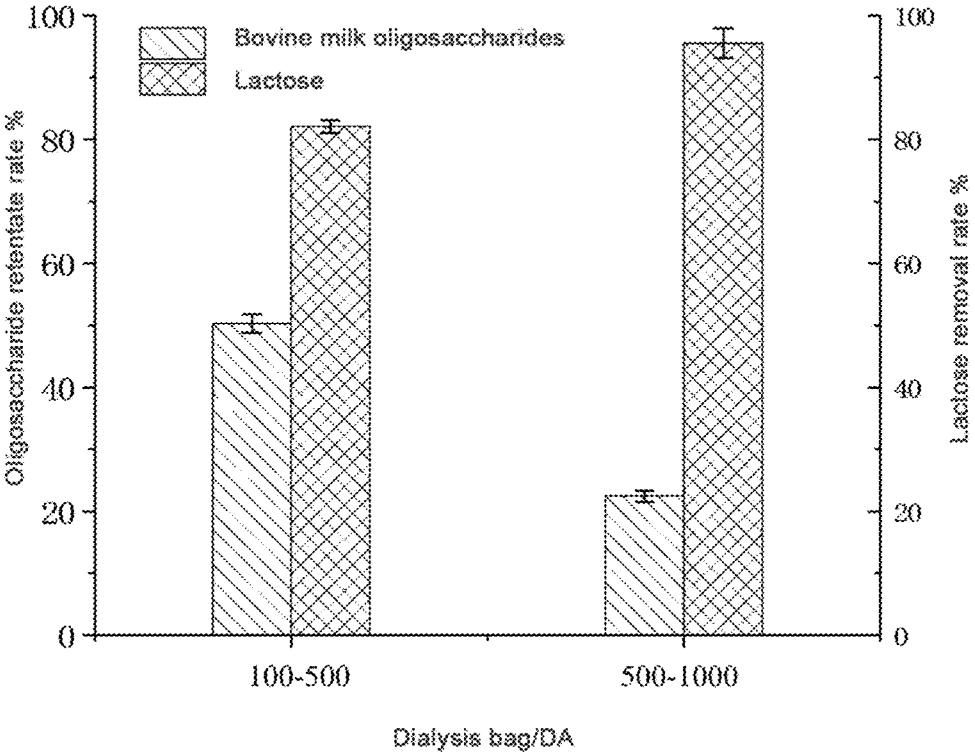
FIG. 15 shows the recovery rate of oligosaccharides and the removal rate of lactose by dialysis bags with different molecular weights in Comparative example 3.

Oligosaccharide detection and lactose detection were carried out, and the results were shown in FIG. 15, which indicated that the lactose removal rate by the dialysis bag with 100 to 500 Da in the comparative example was only about 81%, but the recovery rate of oligosaccharide from the retentate was not ideal; although the dialysis bag with 500 to 1000 Da can better remove lactose, the recovery rate of oligosaccharide was greatly reduced correspondingly.

Comparative Example 3. Removal of Lactose by Crystallization Method

The nanofiltration retentate in Example 3 was crystallized to produce lactose mother liquor. The nanofiltration retentate was concentrated to 50° B é by a rotary evaporator, and two fractions of the concentrate were added with 0.02% seed crystal for crystallization at room temperature and 4° C., respectively, and the other two fractions were crystallized without addition of seed crystal under the same conditions as control. After obtaining the supernatant, the crystalline lactose was rinsed with a small amount of ice water (4° C.). Then, the crystallization conditions were screened based on the yield of oligosaccharide and the removal rate of lactose. The lactose seed crystal was purchased from Hilma (USA).

Figure 16:
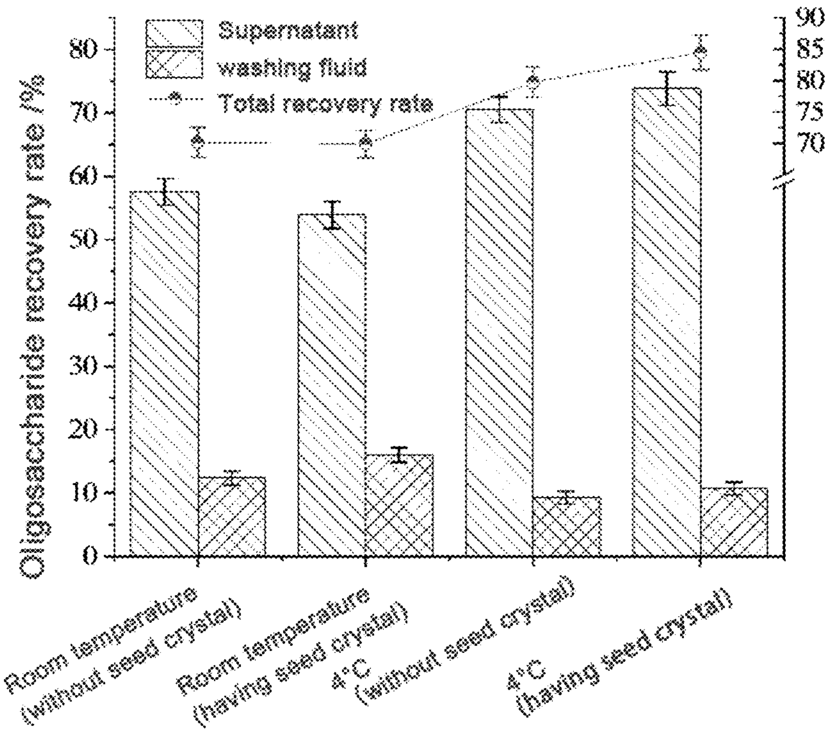
FIG. 16 shows the recovery rate of bovine milk oligosaccharides and the removal rate of lactose by different crystallization methods in Comparative example 4.
Figure 16:
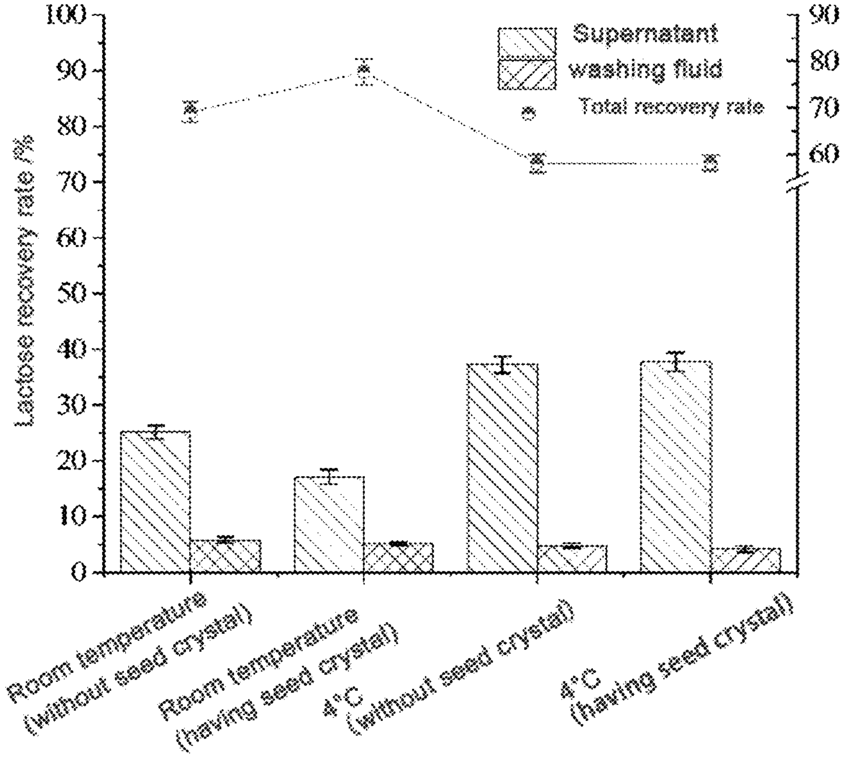

Oligosaccharide detection and lactose detection were carried out, and the results were shown in FIG. 16, which indicated that the effect of removal of lactose by the crystallization method in this comparative example was not satisfying.

The results of the above Comparative examples 2 to 3 showed that, although a large amount of oligosaccharides can be recovered by activated carbon adsorption and crystallization method, a large amount of lactose were recovered correspondingly, and thereby the content of non-prebiotic substances was increased, which may affect the biological activity of milk oligosaccharides. Although the removal method by dialysis bag had a high removal rate of lactose, a lot of milk oligosaccharides were also reduced correspondingly. Therefore, these three methods cannot effectively separate sialyllactose from non-prebiotic substances (lactose), let alone meet the demand for industrialization.

Example 6 Nanofiltration or Electrodialysis Desalination

The chromatographic collections of 3'-sialyllactose and 6'-sialyllactose in Example 5 were combined (all of the three chromatographic packing materials in Example 5 can effectively separate milk oligosaccharides, and therefore, one or more chromatographic collections can be taken as an example; in this example, the collection from separation and purification by Q-Sepharose FF was used), and then subjected to nanofiltration for desalination, in which the used membrane unit was 100 Da.

Alternatively, the above combined collection liquid was loaded into an electrodialysis device for desalination.

The oligosaccharide detection method was the same as above, in which the above two reagents are used for derivatization and detection.

Nanofiltration desalination: 1100 mL of the above combined collection liquid of Example 5 was loaded into a nanofiltration device with the inlet pressure of 10 bar and the outlet pressure of 5 bar. With the continuous penetration of the permeate, 9 L deionized water was added continuously, and when the conductivity no longer changed, the test was finished and the results were shown in FIG. 17.

Figure 18:
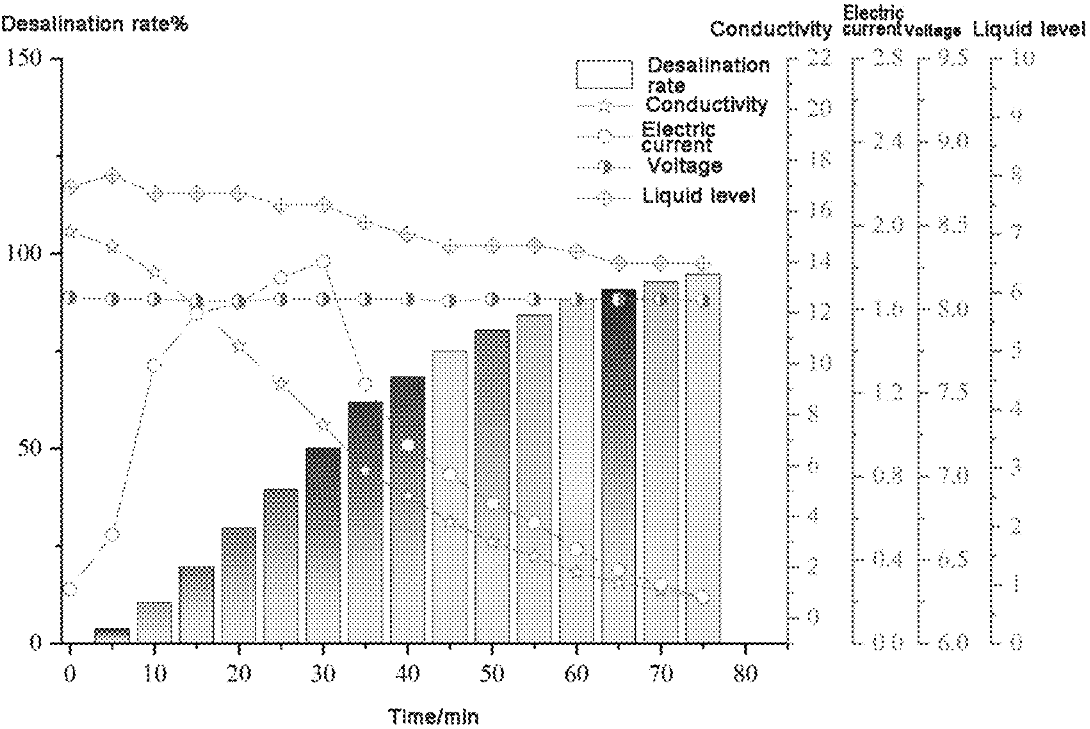
FIG. 18 is a histogram showing the electrodialysis desalination rate in the desalination process of Example 6 of the present application; in which, conductivity: mS/cm, current: A, voltage: V, column volume height: cm.

Electrodialysis desalination: 1700 mL of the above combined collection liquid of Example 5 was loaded into an electrodialysis device with 8 V of the adjustment voltage, 50 L/h of the material flow rate, 50 L/h of the ultra-pure water flow rate, and 45 L/h of the polar liquid flow rate, and when the electric current no longer changed, the test was finished, and the results were shown in FIG. 18.

Figure 17:
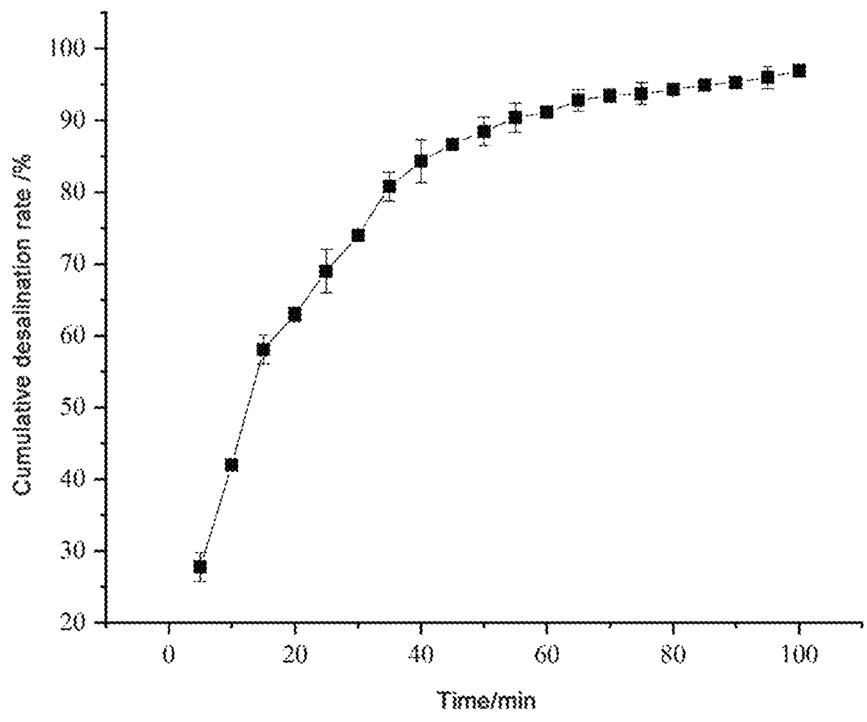
FIG. 17 is a histogram showing the nanofiltration desalination rate in the desalination process of Example 6 of the present application.

As can be seen from FIGS. 17 to 18, the cumulative desalination rates of the nanofiltration desalination and the electrodialysis desalination were 96.61% and 94.5%, respectively, which indicated that these two methods had better desalination rates, and relatively speaking, the nanofiltration desalination showed higher efficiency without resulting in chemical pollution, thus being the preferred method.

Example 7 Freeze Drying

The desalted milk oligosaccharide solution obtained in Example 6 was subjected to a freeze-drying procedure to obtain the milk oligosaccharide powder.

Figure 19:
FIG. 19 is an image of bovine milk oligosaccharide powder of Example 7 of the present application.

Specifically, firstly, the solution was placed on the sample shelf of the freeze dryer for pre-freezing. Subsequently, according to the process, the heating program of vacuum freeze drying was set as: 20° C. for 2 h, 40° C. for 1 h, and 55° C. until to the end. Additionally, the cold trap temperature was set at −50° C., and the vacuum degree was at 2.50 to 6.50 MPa. The drying was not finished until the moisture content on dry basis was less than 5%. The physical image of the bovine milk whey powder was shown in FIG. 19. As can be seen from FIG. 19, the bovine milk oligosaccharide powder was white or light yellow in color, uniform in size, and there were no impurities visible. The preparation method of the present disclosure comprises the following steps: skimmed milk being subjected to microfiltration concentration to obtain a microfiltration permeate, the microfiltration permeate being then subjected to ultrafiltration to obtain an ultrafiltration permeate (or the reconstituted desalted whey powder solution being subjected to ultrafiltration to obtain the ultrafiltration permeate), the ultrafiltration permeate being then subjected to nanofiltration to obtain a nanofiltration retentate, the nanofiltration permeate being then subjected to reverse osmosis to prepare reverse osmosis water, which is then used in the washing and filtering steps of microfiltration, ultrafiltration, and nanofiltration, thereby forming a series of environment-friendly processes, removing the residual lactose from the nanofiltration retentate by chromatography, subjecting the chromatographic collection liquid to another nanofiltration to obtain the milk oligosaccharide solution, which is then subjected to freeze-drying to obtain the milk oligosaccharide powder. In the present disclosure, the milk oligosaccharide powder is obtained by microfiltration, ultrafiltration, nanofiltration, reverse osmosis, chromatography, and freeze-drying technologies, which do not involve fermentation and enzymatic conversion as compared with that produced by the traditional bioengineering technology, and thereby remain the natural structure of milk oligosaccharides. Additionally, it has excellent processing quality characteristics and pure flavor, and shows wide application prospects in food industry.

Finally, it should be noted that the above embodiments are only used to illustrate the technical solutions of the present invention and not to limit it; although the present invention has been described in detail with reference to the foregoing embodiments, it will be understood by one of ordinary skill in the art that the technical solutions described in the foregoing embodiments can still be modified or some technical features can be equivalently substituted; however, these modifications or substitutions do not make the essence of the corresponding technical solutions departing from the spirit and scope of the technical solutions of various embodiments of the present invention.

INDUSTRIAL APPLICABILITY

The present disclosure provides a method for preparing milk oligosaccharides, and milk oligosaccharide powder and food prepared by the same, wherein the method comprises the following steps of: performing ultrafiltration of whey liquid for at least three times, subjecting the ultrafiltration permeate to nanofiltration concentration for several times, then subjecting the nanofiltration retentate to chromatographic separation and purification, collecting chromatographic collection liquid containing sialyllactose while removing the fraction containing lactose, subjecting the collection to desalination and drying to obtain the oligosaccharide powder. The milk oligosaccharides prepared by the present invention and the food products containing the same comprise basically bovine milk oligosaccharides, which are light yellow or white in color, light in flavor, uniform in size, and have good thermal stability and solubility. The milk oligosaccharides mainly comprise 3'-sialyllactose and 6'-sialyllactose.

The invention claimed is:

1. A method for preparing milk oligosaccharides, comprising the steps of: performing ultrafiltration of whey liquid for at least three times, subjecting the ultrafiltration permeate to nanofiltration concentration for six times, then subjecting the nanofiltration retentate to chromatographic separation and purification, collecting chromatographic collection liquid containing sialyllactose while removing the fraction containing lactose, subjecting the collection to desalination and drying to obtain oligosaccharide powder, wherein, in the chromatographic separation and purification step, the carrier of the chromatographic packing material is an agarose-based weak anion exchanger, the ion exchange group of which is a diethylaminoethyl group;

wherein the whey liquid is reconstituted from desalted whey powder and water, and the mass ratio of desalted whey powder to water is 1:4 to 20;

in the ultrafiltration step, the used ultrafiltration membrane has a molecular weight cut-off of 5 kDa to 30 kDa; the ultrafiltration membrane is a composite tubular organic membrane; the ultrafiltration is performed under conditions as follows: the feed temperature is 20° C. to 45° C., the inlet pressure is 6 to 9 bar, the outlet pressure is 5 to 8 bar; the membrane pressure difference is not more than 3 bar;

in the nanofiltration step, the used nanofiltration membrane has a molecular weight cut-off of 100 Da to 3000 Da; the nanofiltration membrane used in the nanofiltration step is a composite tubular organic membrane; the nanofiltration is performed under conditions as follows: the feed temperature is 20° C. to 45° C., the inlet pressure is 16 to 20 bar, the outlet pressure is 14 to 18 bar;

the membrane pressure difference is not more than 3 bar;

the desalination is performed by nanofiltration; the desalination by nanofiltration comprises: separating the chromatographic collection liquid through nanofiltration, washing and filtering with deionized water until the conductivity does not decrease any longer, and concentrating to the minimum cycling volume of the device to obtain a concentrated nanofiltration retentate, at which time the nanofiltration concentration is finished; the nanofiltration membrane used in the desalination by nanofiltration has a molecular weight cut-off of 100 Da to 500 Da; the nanofiltration membrane used in the desalination by nanofiltration is a composite tubular organic membrane; the desalination by nanofiltration is performed under conditions as follows: the feed temperature is 20° C. to 45° C., the inlet pressure is 10 to 15 bar, and the outlet pressure is 5 to 10 bar; the membrane pressure difference is not more than 3 bar; and the drying step is performed by freeze drying; the freeze-drying step comprises: loading the desalted concentrated retentate into a freeze dryer for drying, the freeze-drying step comprises:

setting the heating program of the vacuum freeze-drying as: 20° C. for 2 h, 40° C. for 1 h, and 55° C. until to the end, with the cold trap temperature being set at −50° C., and the vacuum degree at 2.50 to 6.50 MPa, and the drying is not finished until the moisture content on dry basis is less than 5%.

2. The method according to claim 1, wherein said collecting chromatographic collection liquid containing sialyllactose is performed as follows: collecting the chromatographic collection liquid into a tube and performing detections on the same, and combining the chromatographic collection liquid containing sialyllactose, in which the detection of sialyllactose is performed by an oligosaccharide detection method.

3. The method according to claim 1, wherein, the chromatographic separation and purification step comprises:

loading the nanofiltration retentate into a 1.5 cm×20 cm agarose-based weak anion exchanger column, the ion exchange group of which is a diethylaminoethyl group at a flow rate of 1 to 2 mL/min, and collecting the effluent at 0.5-1.5 mL/tube; optionally, the flow rate is 1.5 mL/min, and the collection of the effluent is performed at 1 mL/tube.

4. The method according to claim 1, wherein the ultrafiltration for at least three times comprises: concentrating the microfiltration permeate through ultrafiltration until reaching 2 to 7 cycles of concentration to obtain the first ultrafiltration permeate; diluting the first ultrafiltration retentate with water, followed by concentrating through ultrafiltration until reaching 2 to 7 cycles of concentration to obtain the second ultrafiltration permeate; diluting the second ultrafiltration retentate with water, followed by concentrating through ultrafiltration until reaching 2 to 7 cycles of concentration to obtain the third ultrafiltration permeate; optionally, the ultrafiltration is performed six times.

5. The method according to claim 1, wherein the procedure of nanofiltration concentration for six times comprises: concentrating the ultrafiltration permeate through nanofiltration until reaching 2 to 13 cycles of concentration to obtain the first nanofiltration retentate; diluting the first nanofiltration retentate with water, followed by concentrating through nanofiltration until reaching 2 to 13 cycles of concentration to obtain the second nanofiltration retentate; diluting the second nanofiltration retentate with water, followed by concentrating through nanofiltration until reaching 2 to 13 cycles of concentration to obtain the third nanofiltration retentate.

6. The method according to claim 1, wherein the method further comprises: concentrating the nanofiltration permeate by reverse osmosis to generate deionized water suitable for the process;

optionally, the concentration by reverse osmosis specifically comprises: concentrating the nanofiltration permeate by reverse osmosis to the minimum cycling volume of the device to obtain a reverse osmosis permeate, at which time the reverse osmosis is finished;

optionally, the membrane used in the reverse osmosis has a stable desalination rate of 99.5%;

optionally, the reverse osmosis is performed under conditions as follows: the feed temperature is 20° C. to 45° C., the inlet pressure is 16 to 20 bar, the outlet pressure is 14 to 18 bar; optionally, the membrane pressure difference is not more than 3 bar;

and/or, the procedures of ultrafiltration, nanofiltration, and reverse osmosis adopt an integrated ultrafiltration-nanofiltration-reverse osmosis device.

* * * * *